United States Patent [19]
Takahashi et al.

[11] Patent Number: 4,473,856
[45] Date of Patent: Sep. 25, 1984

[54] OVERCURRENT PROTECTION APPARATUS FOR DC MOTOR

[75] Inventors: Kenichiroh Takahashi; Hiromitsu Nakano, both of Katano; Isao Yoshida, Suita, all of Japan

[73] Assignee: Matsushita Electric Industrial Co., Ltd., Kadoma, Japan

[21] Appl. No.: 335,358

[22] Filed: Dec. 29, 1981

[30] Foreign Application Priority Data

Dec. 29, 1980 [JP] Japan .................. 55-188665

[51] Int. Cl.³ .............................. H02H 7/08
[52] U.S. Cl. .................... 361/31; 361/94; 361/87
[58] Field of Search .......... 361/31, 94, 98, 100, 361/101, 87, 83

[56] References Cited

U.S. PATENT DOCUMENTS

| | | | |
|---|---|---|---|
| 3,558,978 | 1/1971 | Nye, Jr. et al. | 361/31 X |
| 3,564,337 | 2/1971 | MacGeorge | 361/31 X |
| 3,845,405 | 10/1974 | Leidich | 361/98 X |
| 4,052,625 | 10/1977 | Cameron | 361/31 X |

Primary Examiner—Harry E. Moose, Jr.
Attorney, Agent, or Firm—Cushman, Darby & Cushman

[57] ABSTRACT

An overcurrent protection apparatus for a DC motor which can be used with a speed control system of a DC motor to prevent an overcurrent condition arising when the DC motor is run with a heavy load or locked by an overload from burning or overheating windings of the motor. The apparatus is constructed using at least one integrated circuit and includes a current mirror circuit for detecting an overcurrent and for cutting off the supply current of the DC motor. A timing circuit prevents overcurrents lasting only a short time from triggering the apparatus to shut down the motor. Once the apparatus is triggered to shut off the motor, the motor will remain off for an indefinite period of time until the apparatus is reset.

20 Claims, 9 Drawing Figures

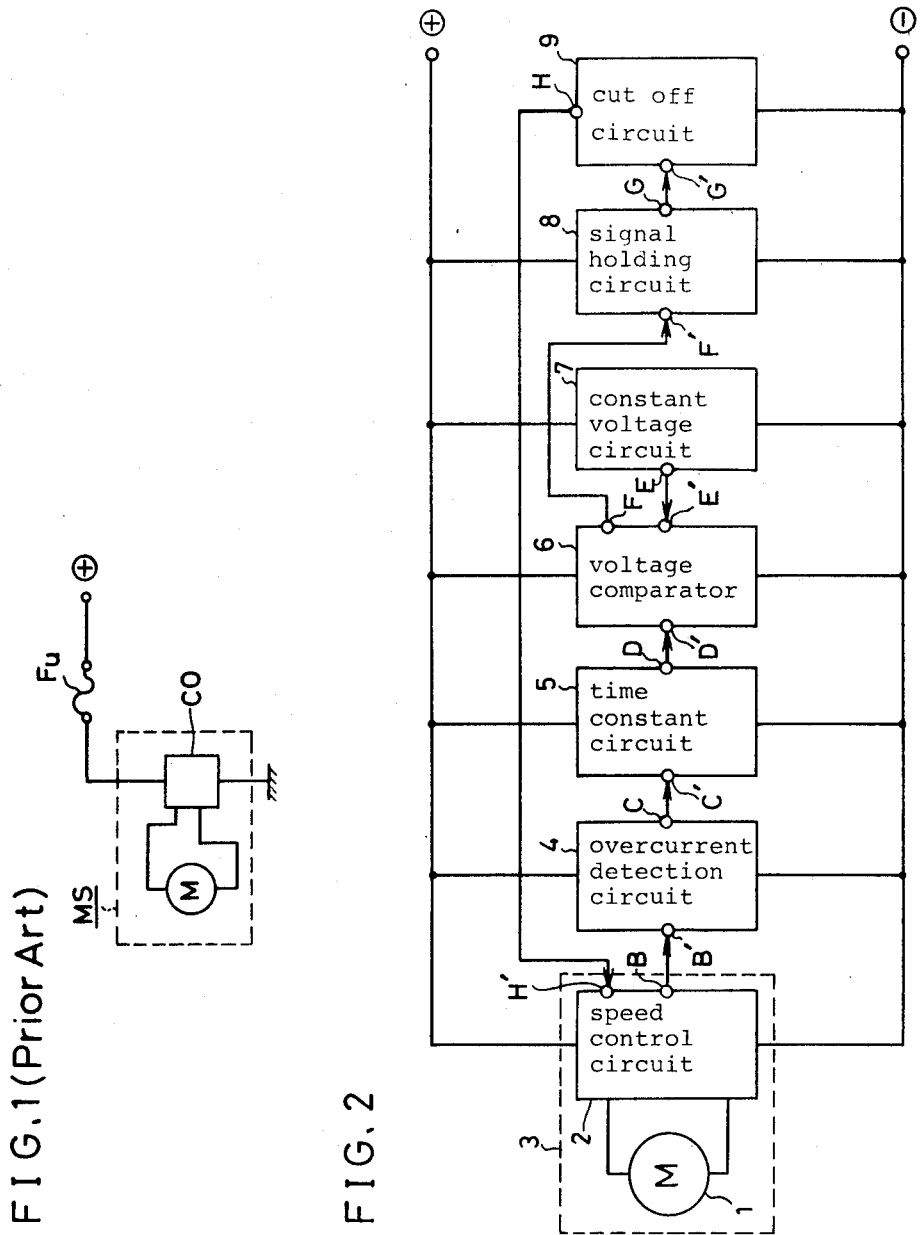

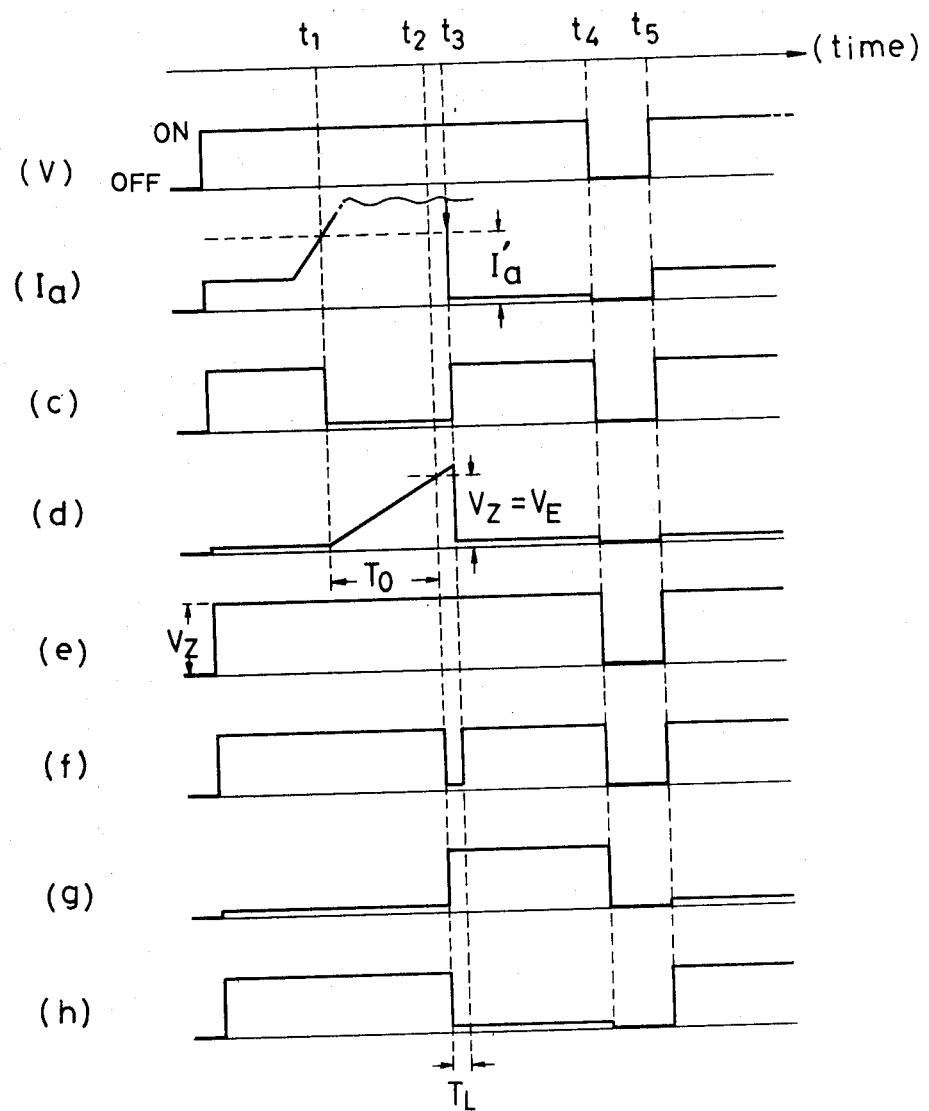

OVERCURRENT PROTECTION APPARATUS FOR DC MOTOR

FIELD OF THE INVENTION

The present invention relates to an apparatus for overcurrent protection of a DC motor.

More particularly, the present invention is an apparatus for providing overcurrent protection to a DC motor running with a heavy load or locked by an overload to prevent the windings of the motor from overheating or burning.

DESCRIPTION OF THE PRIOR ART

FIG. 1 is a circuit diagram of a conventional overcurrent protection apparatus for a DC motor, for protecting a DC motor from an overcurrent caused by running it with a heavy load.

In FIG. 1, a speed control system for a DC motor generally comprises a DC motor M and a speed control circuit CO. An overcurrent detection element, such as a fuse Fu, has been connected in series with the speed control circuit CO and a power source to disconnect the motor from the power source when an overcurrent condition occurs.

In the above-mentioned conventional apparatus, the supply of power from the power source is cut off by the speed control circuit when the current drawn by the DC motor exceeds a predetermined value. A problem with the conventional apparatus is that once the power supply is cut out, the motor operation is not restored when the cause of the overcurrent is removed. The restoration of the power supply can not be attained until the fuse or the like element is replaced. It is troublesome and requires substantial labor to renew the fuse or like element, especially when the motor is inaccessible, such as in the case of a motor mounted in compact sound reproducing set, such as a tape recorder or the like.

SUMMARY OF THE INVENTION

The present invention is highly reliable overcurrent protection apparatus for a DC motor without the abovementioned problem of the conventional overcurrent protection apparatus but with no detriment to the performance of the motor.

BRIEF DESCRIPTION OF THE DRAWING

FIG. 1 is a circuit diagram of the conventional overcurrent protection apparatus for a DC motor.

FIG. 2 is a block diagram of the exemplary embodiment of present invention.

FIG. 9 is a signal waveform chart of signals appearing at several points in the exemplary embodiment of the present invention.

DESCRIPTION DETAILED OF THE PREFERRED EXEMPLARY EMBODIMENTS

Figure 3:
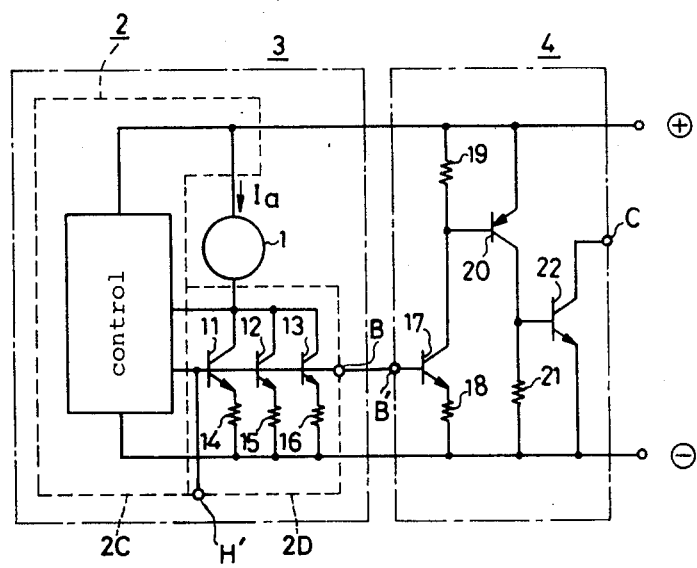
FIG. 3 is a circuit diagram of the speed control system and overcurrent detection circuit of an exemplary embodiment of the present invention.

The exemplary embodiment of an overcurrent protection apparatus for a DC motor in accordance with the present invention is connected to a DC power source and comprises:

an overcurrent detection circuit for issuing an output signal and maintaining said output signal level during an interval when a supply current for the DC motor exceeds a predetermined value, a constant-voltage circuit for providing a reference voltage, a time constant circuit for issuing an output signal, the level of which increases with a predetermined time contant during an interval when an output signal of the overcurrent detection circuit is received, a voltage comparator for comparing an output signal level of the time constant circuit with the reference voltage of the constant-voltage circuit and issuing an ON output signal when the former is larger than the latter, a signal holding circuit for holding an output signal level of the voltage comparator, and a shut down circuit for cutting off the supply current for the DC motor upon receipt of the output signal of the signal holding circuit wherein the overcurrent detection circuit, the time constant circuit and the voltage comparator return to their initial state when the supply current is cut off, and the signal holding circuit holds its output signal when the motor supply current is cut off.

The overcurrent apparatus of the present invention will be elucidated referring to FIG. 2 to FIG. 9.

Referring to FIG. 2, a speed control system 3 comprises a direct-current (DC) motor 1 and a speed control circuit 2. An overcurrent detection circuit 4, which issues an output signal when supply current for DC motor 1 exceeds a predetermined value, is connected to an output terminal B of speed control circuit 2. An output terminal C of overcurrent detection circuit 4 is connected to an input terminal C' of a time constant circuit 5, and an output terminal D of the time constant circuit is connected to a first input terminal D' of a voltage comparator 6. An output terminal E of a constant-voltage circuit 7 is connected to a second input terminal E' of voltage comparator 6. An output terminal F of voltage comparator 6 is connected to an input terminal F' of a signal holding circuit 8, and an output terminal G of the signal holding circuit is connected to an input terminal G' of a cut off circuit 9. An output terminal H of cut off circuit 9 is connected to an input terminal H' of speed control circuit 2.

Speed control system 3 and overcurrent detection circuit 4 are shown in FIG. 3.

Referring to FIG. 3, the speed control circuit 2 comprises a control 2C and a driving circuit 2D. Transistors 11, 12, and 13 of the same conductivity type (NPN type) and of the same electric characteristics are connected in common at their bases and collectors. The bases are connected to an input terminal H'. The common collectors of transisters 11, 12 and 13 are connected to one terminal of DC motor 1. The other terminal of DC motor 1 is connected to the positive terminal of the power source. The common emitters of transistors 11, 12, and 13 are connected through emitter resistors 14, 15, and 16 respectively, all of the same resistance, to the negative terminal of the power source, which is the ground terminal. Commonly-connected bases of transistors 11, 12, 13 are connected to the base of an NPN transistor 17 The four transistors 11, 12, 13 and 17 together form a current mirror circuit which controls the load current $I_a$ of DC motor 1. The NPN type transistor 17 has the same electric characteristics as transistors 11, 12, and 13. The emitter of transistor 17 is connected through a resistor 18 to the negative terminal of the power source and the collector of transistor 17 is connected through a resistor 19 to the positive terminal of the power source. The base of a PNP type transistor 20 is connected to the collector of transistor 17. The emitter of transistor 20 is connected to the positive terminal of the power source, and the collector of transistor 20 is connected through a resistor 21 to the ground terminal. The base of a NPN type transistor 22 is connected to the collector of transistor 20, its emitter is connected to the ground terminal and its collector is connected to output terminal C. Where resistor 18 is selected to have the same resistance as resistors 14, 15 and 16, the same current will flow through each of the collectors of transistors 11, 12, 13, 17. Thus, the current flowing through transistor 17 is equal to one third of the load current $I_a$ of DC motor 1.

In the general case, where:

$I_{17}$ is the current flowing through the collector of transistor 17, $I_a$ is the supply current for DC motor 1, n is the the number of transistors in the current mirror circuit connected in common by their collectors and bases, through which load current of the DC motor 1 flows, (in the circuit depicted n=3), $R_0$ is the resistance of each of the resistors connected in series to the emitters of the transistors in the current mirror circuit, $R_{18}$ is the resistance of resistor 18 connected to the emitter of the transistor 17, collector current $I_{17}$ of the transistor 17 is given by the following formula:

$$I_{17} = I_a/n \times R_0/R_{18} \quad (1).$$

A voltage drop is created across resistor 19 equal to emitter-base voltage $V_{BE20}$ of the transistor 20. Where the resistance of the resistor 19 is $R_{19}$ the emitter base voltage of transistor 20 is given as follows:

$$V_{BE20} = I_{17} \times R_{19} = I_a/n \times R_0/R_{18} \times R_{19} \quad (2).$$

When $V_{BE20}$ exceeds the base-emitter threshold voltage (about 0.6–0.7 V) of transistor 20, transistor 20 turns on. Transistor 22 also turns on because voltage across the resistor 21, which is equal to the base-emitter voltage of the transistor 22, exceeds the base-emitter threshold voltage of transmitter 22.

By selecting the number n of the transistors forming the current mirror circuit and selecting suitable valves for resistors $R_0$, $R_{18}$, $R_{19}$ an overcurrent detecting set point $I_a'$ may be selected according to the following formula:

$$I_a' = n \times R_{18}/R_0 \times 1/R_{19} \times \\ V_{BE20} \approx n \times R_{18}/R_0 \times 1/R_{19} \times 0.6 \quad (3).$$

where the threshold voltage of transistor 20 is approximated by 0.6 V.

The overcurrent detection circuit 4 will issue an ON (lower logic level) output signal by turning on transistor 22 when supply current $I_a$ of motor 1 exceeds over-current detecting the set point $I_a'$.

Figure 4:
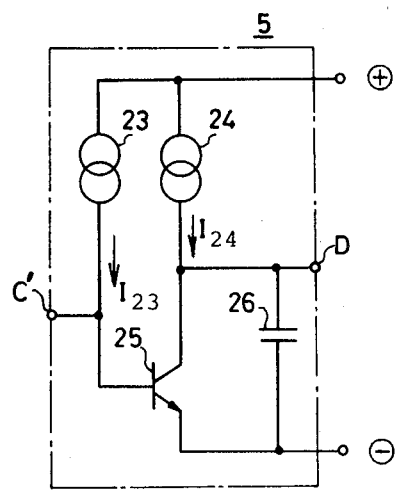
FIG. 4 is a circuit diagram of the time constant circuit of an exemplary embodiment of the present invention.

Referring to FIG. 4, a circuit diagram of the time constant circuit 5 is shown.

A constant current source 23 is connected between an input terminal C' and the positive terminal of the power source. The base of a transistor 25 also connected to input terminal C' which is connected to output terminal C of overcurrent detection circuit 4. A constant current source 24 is connected between the collector of transistor 25 and the positive terminal of the power source, and the emitter of transistor 25 is connected to the power source ground terminal. A capacitor 26 is connected between the collector of transistor 25 and the ground terminal. The collector of the transistor 25 is also connected to an output terminal D. When an input voltage to input terminal C' is in the high logic level (transistor 22 of overcurrent detection circuit 4 is in the OFF state), a constant current $I_{23}$ supplied from constant current source 23 flows through the base of transistor 25. At the same time, a constant current $I_{24}$ supplied from constant current source 24 flows through the collector of transistor 25. In this state the potential at output terminal D is nearly zero. When transistor 22 of overcurrent detection circuit 4 changes to the ON state, the input voltage at input terminal C' is pulled down almost to zero. The base current of transistor 25 is cut-off, and transistor 25 turns OFF. Constant current $I_{24}$ can no longer flow through transistor 25, and instead flows into the capacitor 26 and charges the capacitor.

Where Q is the charge of capacitor 26, the capacitance of the capacitor 26 is $C_{26}$, and the time during which capacitor 26 charges is T, a voltage $V_C$ across capacitor 26 is given as follows:

$$V_C = Q/C_{26} = (I_{24} \times T)/C_{26} \quad (4).$$

As shown in the formula (4), voltage $V_C$ is a function of the charging time T of capacitor 26.

The potential $V_C$ at output terminal D of time constant circuit 5 is determined by formula (4). When current $I_{24}$ and, capacitance $C_{26}$ are constant, the voltage across capacitor 26 the output voltage $V_D$ of time constant circuit 5 is given as follows:

$$V_D = V_C = I_{24}/C_{26} \times T \quad (5).$$

Figure 5:
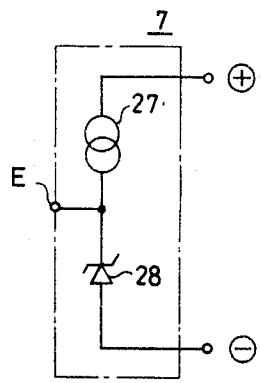
FIG. 5 is a circuit diagram of the constanz-voltage circuit of an exemplary embodiment of the present invention.

Referring to FIG. 5, shown is a circuit diagram of constant-voltage circuit 7 of.

Constant current source 27 and a Zener diode 28 are connected in series across the terminals of the power source. A reference voltage $V_E$ equal to the Zener voltage $V_Z$ of Zener diode 28 appears at an output terminal E.

In addition, single Zener diode 28 may be replaced by two or more Zener diodes connected in series for obtaining a desired reference voltage. One or more silicon diodes connected in series will fulfill the same purpose.

Figure 6:
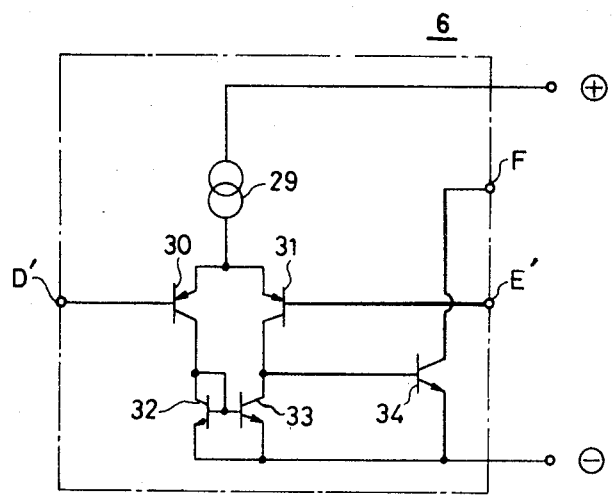
FIG. 6 is a circuit diagram of the voltage comparator of an exemplary embodiment of the present invention.

Referring to FIG. 6 a circuit diagram of voltage comparator 6 is shown.

PNP type transistors 30 and 31 are connected in common at their emitters and connected through a constant current source 29 to the positive terminal of the power source to form a difference amplifier. Emitter grounded NPN type transistors 32 and 33 are connected in common at their bases, and their common bases are connected to the collector of transistor 32. The collector of transistor 30 is connected to the collector of transistor 32, and the collector of the transistor 31 is connected to the collector of transistor 33. The base of an NPN transistor 34 is connected to the collector of transistor 33, and the emitter of the transistor 34 is connected to the ground terminal of the power source. The base of transistor 30 is connected to a first input terminal D', and the base of the transistor 31 is connected to a second input terminal E'. The collector of transistor 34 is connected to an output terminal F. When an input voltage applied to first input terminal D' is lower than an input voltage applied to second input terminal E', a constant current from constant current source 29 flows through transistor 30 and transistor 32. A base current flows through transistor 33 of the current mirror circuit, turning transistor 33 ON. The base of transistor 34 is pulled down, turning it OFF. When the input voltage to first input terminal D' becomes higher than the input voltage to second input terminal E', transistor 30 turns OFF, causing transistors 32 and 33 of the current mirror circuit also to turn OFF. The constant current from current source 29 flows through the transistor 31, and transistor 34 turns ON.

Figure 7:
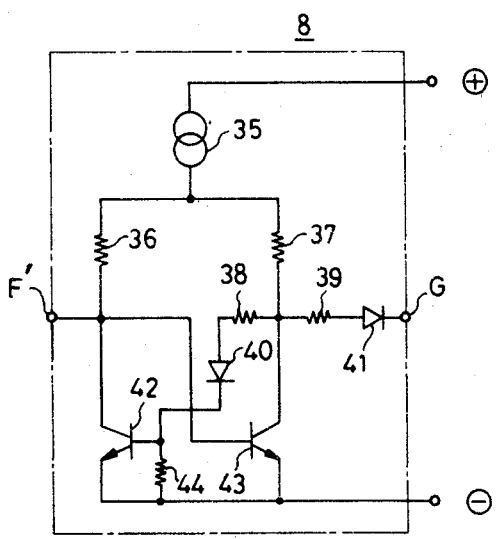
FIG. 7 is a circuit diagram of the signal holding circuit of an exemplary embodiment of the present invention.

Referring to FIG. 7, a circuit diagram of signal holding circuit 8 is shown. Collectors of emitter grounded NPN transistors 42 and 43 are connected through resistors 36 and 37, respectively, to a terminal of a constant current source 35. The other terminal of constant current source 35 is connected to the positive terminal of the power source. The collector of transistor 42 is also connected to an input terminal F', and the base of transistor 42 is connected through a resistor 44 to the ground terminal of the power source. The base of transistor 43 is connected to the collector of transistor 42. The cathode of a diode 40 is connected to the base of transistor 42, and the anode of the diode is connected to the collector of transistor 43 through a resistor 38. The cathode of a diode 41 is connected to an output terminal G, and the anode of the diode is connected to the collector of transistor 43 through a resistor 39. Transistors 42 and 43, resistors 36, 37, 38, 39 and 44 and diodes 40 and 41 form a flip-flop circuit. When the power source supplies voltage to signal holding circuit 8, transistor 43 immediately turns ON, and transistor 42 turns OFF.

Soon after, the input voltage at input terminal F' will become almost zero because of the transistor 34 voltage comparator turns ON. This causes transistor 43 to turn OFF and transistor 42 to turn ON. Output voltage of output terminal G rises up to the high logic level. The output voltage at output terminal G remains in the high logic level even when an input voltage is applied to input terminal F' as a result of turning OFF transistor 34 of the voltage comparator 6 because the base current of transistor 42 continues to flow through resistor 38 and diode 40 thereby maintaining transistor 42 in the ON stage. Therefore, the input signal to input terminal F' flows through transistor 42, and transistor 43 remains OFF.

The output voltage of output terminal G can be pulled down to the low logic level by grounding the collector of the transistor 43 for a short time or by cutting off the power source for a short time.

Figure 8:
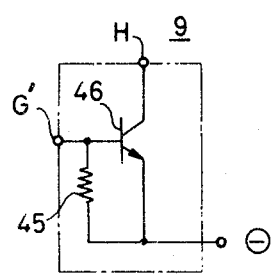
FIG. 8 is a circuit diagram of the cut off circuit of an exemplary embodiment of the present invention.

Referring to FIG. 8, shown is a circuit diagram of cut off circuit 9 of. A transistor 46 is connected by its base to an input terminal G', by its emitter to the ground terminal of the power source and by its collector to an output terminal H. Output terminal H is connected to input terminal H' of speed control circuit 2 shown in FIG. 3. A resistor 45 is connected between the base and the emitter of transistor 46. The resistance of resistor 45 is selected to be the same resistance as that of resistor 44 of signal holding circuit 6 shown in FIG. 7. Transistor 46 turns ON when the input voltage of input terminal G' exceeds the base-emitter threshold voltage (about 0.6–0.7 volts) of transistor 45.

Referring to FIGS. 3 and 8, when cut off circuit 9 is turned on, transistor 46 turns on, grounding the basis of transistors 11, 12 and 13 of the current mirror circuit. The supply current for DC motor 1 is thus cut off.

Referring to FIG. 9, shown is a signal waveform chart of signals at several points on the over current protection apparatus of FIG. 2. An overall operation of the apparatus of this invention will be elucidated by referring to FIG. 2 and FIG. 9.

FIG. 9(V) shows a waveform of the power source voltage across the terminals of the power source. FIG. 9($I_a$) shows a waveform of the supply current $I_a$ for DC motor 1.

A signal waveform appearing at the output terminal C of the overcurrent detection circuit 4 and input terminal C', of time constant circuit 5 is shown in FIG. 9(c).

At a time $t_1$ when the supply current $I_a$ for DC motor 1 increases and reaches the overcurrent detecting set point $I_a'$ determined by the circuit elements of overcurrent detection circuit 4 the signal waveform of output terminal C and input terminal C' changes from a high logic level to a low logic level. Therefore, at the time $t_1$, the output voltage of the output terminal D of time constant circuit 5, determined by the voltage across capacitor 26, begins to increase as shown in FIG. 9(d). The output voltage of output terminal D is connected to the first input terminal D' of voltage comparator 6. At a time $t_2$ when the input voltage of terminal D' of voltage comparator 6 exceeds the Zener voltage $V_Z$ appearing at output terminal E of constant-voltage circuit 7 depicted in FIG. 9(e) (the input reference $V_E$ voltage the second input terminal E' of voltage comparator 6), the voltage of the output terminal F of voltage comparator 6 immediately drops to almost zero as shown in FIG. 9(f). The voltage of terminal F is applied to input terminal F' of signal holding circuit 8. Therefore, at time $t_2$, the output voltage of output terminal G of signal holding circuit 8 immediately rises up to the high logic level and remains there as shown in FIG. 9(g). The voltage of output terminal G is applied to input terminal G' of cut off circuit 9, so that the output voltage of the output terminal H of the cut off circuit immediately drops to almost zero responding to the changing of the output voltage of signal holding circuit 8. This is shown in FIG. 9(h). The output terminal H of cut off circuit 9 is connected to the input terminal H' of speed control circuit 2. Accordingly, at time $t_2$, the bases of the current mirror circuit (transistors 11, 12 and 13) of the speed control circuit 2 are grounded. Hence, the supply current $I_a$ for DC motor 1 is cut off at time $t_3$, which is time $t_2$ plus a short delay time $T_L$, and the motor is stopped. The length of delay $T_L$ is exaggerated in the diagrams to aid understanding of the operation of the apparatus; in actual operation, $T_L$ is very short.

When the supply current $I_a$ is cut off, overcurrent detection circuit 4, time constant circuit 5 and voltage comparator 6 return to their reset state (i.e. initial state). However, DC motor 1 remains stopped because the supply current $I_a$ remains cut off by the output signal holding action of signal holding circuit 8. Output terminal G of signal holding circuit 8 will remain high until the power source is manually turned OFF. By cutting off the power source at time $t_4$, and turning the power source back on at time $t_5$, all circuits of the apparatus return to the initial state and DC motor 1 resumes operation.

Referring to FIGS. 3, 4 and 5, capacitor 26 of time constant circuit 5 begins charge when that the supply current $I_a$ of DC motor 1 exceeds the overcurrent detecting set point $I_a'$ determined by the circuit elements of overcurrent detection circuit 4.

The voltage $V_C$ across capacitor 26 is given by formula (4) as follows:

$$V_C = (I_{24} \times T)/C_{26} = C_0 \times T \qquad (6),$$

where ($C_0 = I_{24}/C_{26}$ = constant). Hence, the charging period $T_0$ for charging capacitor 26 from zero charge to the charge at which its level exceeds the reference voltage $V_E$ of constant voltage circuit 5 is given as follows:

$$V_C = C_0 \times T \geq V_Z$$

$$T \geq V_Z/C_0 = (V_Z \times C_{26})/I_{24} = T_0 \qquad (7).$$

If supply current $I_a$ drops below the overcurrent detecting set point $I_a'$ before charging time T equals or exceeds charging period $T_0$, the charge on capacitor 26 immediately discharges through transistor 25 of time constant circuit 5.

The charging period $T_0$ can be selected to any desirable period by selecting the reference voltage $V_E$, the capacitance of capacitor 26 and the constant current $I_{24}$ supplied from constant current source 24. DC motor 1 may draw substantially more current than overcurrent detecting set point $I_a$ for a short time. Charging period $T_0$ should be selected to exceed this short start-up time to prevent time constant circuit 5 from issuing an input signal every time DC motor 1 is started.

An overcurrent protection apparatus according to the present invention does not interfere with the fundamental performances of a DC motor, highly reliable operation can be obtained.

What is claimed is:

1. An overcurrent protection apparatus for a DC motor connected to a DC power source, comprising:
   an overcurrent detection circuit for issuing and maintaining a first output signal during an interval when a supply current to said DC motor exceeds a predetermined value,
   a constant-voltage circuit for providing a reference voltage,
   a time constant circuit for issuing a second output signal, the level of which increases with a predetermined time constant during an interval when said first output signal of said overcurrent detection circuit is issued,
   said time constant circuit including
   a first constant current source,
   a second constant current source,
   a transistor connected by its emitter to a ground terminal of said DC power source, by its base to a positive terminal of said DC power source through said first constant current source and to an output terminal of said overcurrent detection circuit and by its collector to said positive terminal of said DC power source through said second constant current source, and
   a capacitor connected by its first terminal to the collector of said transistor and by its second terminal to said ground terminal of said DC power source,
   a voltage comparator for comparing said second output signal of said time constant circuit with said reference voltage of said constant-voltage circuit and issuing an ON output signal when the former is larger than the latter,
   a signal holding circuit for holding said ON output signal of said voltage comparator, and
   a cut off circuit for cutting off said supply current to said DC motor upon receipt of said ON output signal held by said signal holding circuit,
   wherein said overcurrent detection circuit, said time constant circuit and said voltage comparator return to their initial state when said supply current is cut off, and
   said signal holding circuit holds its output signal for an indeterminate time.

2. An overcurrent protection apparatus in accordance with claim 1, wherein
   said signal holding circuit holds said ON output signal for cutting off said supply current to said DC motor during an interval from the time when said supply current exceeds said predetermined value to a time when said DC power source is cut off thereby resetting said signal holding circuit.

3. An overcurrent protection apparatus in accordance with claim 1, further comprising a driver circuit comprising at least one series transistor connected by its collector to said DC motor and by its emitter to a ground terminal of said DC power source; and
   wherein said overcurrent detection circuit comprises:
   a current mirror circuit comprising
   a first transistor connected by its base to the base of said series transistor, by its emitter to said terminal of said DC power source through a resistor and by its collector to a positive terminal of said DC power source through a resistor for mirroring the current flowing through said series transistor of said driving circuit,
   a second transistor connected by its base to the collector of said first transistor, by its emitter to said positive terminal of said DC power source and by its collector to said ground terminal of said DC power source through a resistor, and
   a third transistor connected by its base to the collector of said second transistor, by its emitter to said ground terminal of said DC power source and by its collector to an input terminal of said time constant circuit.

4. An overcurrent protection apparatus in accordance with claim 1, wherein
   said constant voltage circuit comprises
   a constant current source, and
   diode means connected in series with said constant current source for producing a constant voltage drop.

5. An overcurrent protection apparatus in accordance with claim 1, wherein
   said signal holding circuit comprises
   a flip-flop circuit.

6. An overcurrent protection apparatus in accordance with claim 1, wherein
   said cut off circuit comprises a transistor connected by its emitter to a ground terminal of said DC power source, by its base to said ground terminal of said DC power source and to an output terminal of said signal holding circuit and by its collector to an output terminal of said cut off circuit.

7. An overcurrent protection apparatus in accordance with claim 1, further comprising:
a driver circuit comprising at least one series transistor connected by its collector to said DC motor and by its emitter to a ground terminal of said DC power source,
and wherein said cut off circuit is connected by an output terminal to the base of said series transistor of said driving circuit for cutting off said supply control to said DC motor by grounding the base of said series transistor.

8. An overcurrent protection apparatus in accordance with claim 1, wherein
said voltage comparator comprises
a constant current source,
a difference amplifier connected to said constant current source, a first input of said difference amplifier being connected to said second output signal of said time constant circuit, a second input of said difference amplifier being connected to said reference voltage of said constant voltage circuit, and
a current mirror circuit connected to said difference amplifier for issuing an ON signal when said second output signal is larger than said reference voltage.

9. An overcurrent protection apparatus for a DC motor connected to a DC power source comprising:
an overcurrent detection circuit for issuing and maintaining a first output signal during an interval when a supply current to said DC motor exceeds a predetermined value,
a constant-voltage circuit for providing a reference voltage,
a time constant circuit for issuing a second output signal, the level of which increases with a predetermined time constant during an interval when said first output signal of said overcurrent detection circuit is issued,
a voltage comparator for comparing said second output signal of said time constant circuit with said reference voltage of said constant-voltage circuit and issuing an ON output signal when the former is larger than the latter,
said voltage comparator comprising
a constant current source,
a difference amplifier connected to said constant current source, a first input of said difference amplifier being connected to said second output signal of said time constant circuit, a second input of said difference amplifier being connected to said reference voltage of said constant voltage circuit, and
a current mirror circuit connected to said difference amplifier for issuing an ON signal when said second output signal is larger than said reference voltage,
a signal holding circuit for holding said ON output signal of said voltage comparator, and
a cut off circuit for cutting off said supply current to said DC motor upon receipt of said ON output signal held by said signal holding circuit, wherein said overcurrent detection circuit, said time constant circuit and said voltage comparator return to their initial state when said supply current is cut off, and
said signal holding circuit holds its output signal for an indeterminate time.

10. An overcurrent protection apparatus in accordance with claim 9, wherein
said signal holding circuit holds said ON output signal for cutting off said supply current to said DC motor during an interval from the time when said supply current exceeds said predetermined value to a time when said DC power source is cut off thereby resetting said signal holding circuit.

11. An overcurrent protection apparatus in accordance with claim 9, further comprising a driver circuit comprising at least one series transistor connected by its collector to said DC motor and by its emitter to a ground terminal of said DC power source; and
wherein said overcurrent detection circuit comprises:
a current mirror circuit comprising
a first transistor connected by its base to the base of said series transistor, by its emitter to said terminal of said DC power source through a resistor and by its collector to a positive terminal of said DC power source through a resistor for mirroring the current flowing through said series transistor of said driving circuit,
a second transistor connected by its base to the collector of said first transistor, by its emitter to said positive terminal of said DC power source and by its collector to said ground terminal of said DC power source through a resistor, and
a third transistor connected by its base to the collector of said second transistor, by its emitter to said ground terminal of said DC power source and by its collector to an input terminal of said time constant circuit.

12. An overcurrent protection apparatus in accordance with claim 9, wherein
said constant voltage circuit comprises
a constant current source, and
diode means connected in series with said constant current source for producing a constant voltage drop.

13. An overcurrent protection apparatus in accordance with claim 12, wherein said diode means comprises a Zener diode.

14. An overcurrent protection apparatus in accordance with claim 12, wherein said diode means comprises a plurality of Zener diodes connected in series.

15. An overcurrent protection apparatus in accordance with claim 12, wherein said diode means comprises a silicon diode.

16. An overcurrent protection apparatus in accordance with claim 12, wherein said diode means comprises a plurality of silicon diodes connected in series.

17. An overcurrent protection apparatus in accordance with claim 9, wherein
said signal holding circuit comprises
a flip-flop circuit.

18. An overcurrent protection apparatus in accordance with claim 9, wherein
said cut off circuit comprises
a transistor connected by its emitter to a ground terminal of said DC power source, by its base to said ground terminal of said DC power source and to an output terminal of said signal holding circuit and by its collector to an output terminal of said cut off circuit.

19. An overcurrent protection apparatus in accordance with claim 9, further comprising:
    a driver circuit comprising at least one series transistor connected by its collector to said DC motor and by its emitter to a ground terminal of said DC power source,
    and wherein said cut off circuit is connected by an output terminal to the base of said series transistor of said driving circuit for cutting off said supply control to said DC motor by grounding the base of said series transistor.

20. An overcurrent protection apparatus in accordance with claim 9, wherein said time constant circuit comprises
    a first constant current source,
    a second constant current source,
    a transistor connected by its emitter to a ground terminal of said DC power source, by its base to a positive terminal of said DC power source through said first constant current source and to an output terminal of said overcurrent detection circuit and by its collector to said positive terminal of said DC power source through said second constant current source, and
    a capacitor connected by its first terminal to the collector of said transistor and by its second terminal to said ground terminal of said DC power source.

* * * * *